United States Patent
Furukawa et al.

(10) Patent No.: US 6,602,949 B2
(45) Date of Patent: Aug. 5, 2003

(54) VINYL COPOLYMER EMULSION

(75) Inventors: Haruhiko Furukawa, Chiba Prefecture (JP); Takayuki Aso, Chiba Prefecture (JP); Yoshitsugu Morita, Ichihara (JP)

(73) Assignee: Dow Corning Toray Silicone Co., Ltd., Tokyo (JP)

( * ) Notice: Subject to any disclaimer, the term of this patent is extended or adjusted under 35 U.S.C. 154(b) by 0 days.

(21) Appl. No.: 10/020,715

(22) Filed: Dec. 13, 2001

(65) Prior Publication Data

US 2002/0120039 A1 Aug. 29, 2002

(30) Foreign Application Priority Data

Dec. 25, 2000 (JP) ........................................ 2000-392669
Jul. 30, 2001 (JP) ........................................ 2001-228842

(51) Int. Cl.⁷ ............................................ C08F 130/08
(52) U.S. Cl. ........................ 524/806; 525/100; 427/387; 526/279
(58) Field of Search .................... 526/279; 524/806; 525/100; 427/387

(56) References Cited

U.S. PATENT DOCUMENTS 5,177,165 A  *  1/1993  Valint et al. ................. 526/245
5,516,868 A  *  5/1996  Yamazaki et al. ............. 528/12
5,536,782 A  *  7/1996  Takarada et al. ............. 525/100
5,594,067 A  *  1/1997  Doi et al. .................... 524/806
5,731,120 A  *  3/1998  Tanigami et al. ....... 430/111.35
5,773,153 A  *  6/1998  Shiokawa et al. ........... 428/447

FOREIGN PATENT DOCUMENTS

JP         1-284513        11/1989
JP         5-9248           1/1993

* cited by examiner

Primary Examiner—Margaret G. Moore
(74) Attorney, Agent, or Firm—Jim L. DeCesare

(57) ABSTRACT

Stable vinyl copolymer emulsions are capable of forming strongly water repellent and highly water resistant films and coatings, and can be used as paint or coating additives. They are highly compatible with paint and coating compositions. The vinyl copolymer emulsions are produced by emulsion polymerizing (A) 50–99.9 weight percent of a vinyl monomer, (B) 0.1–50 weight percent of a branched organosilicon compound bearing a radically polymerizable organic group, where the sum of components (A) and (B) is 100 weight percent, and (C) a radically polymerizable surfactant used at 0.1–20 weight parts per 100 weight parts of the total amount of components (A) and (B).

5 Claims, No Drawings

VINYL COPOLYMER EMULSION

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

This invention relates to vinyl copolymer emulsions and to their use as additives for paints and coatings. More particularly, it relates to a highly storage stable vinyl copolymer emulsion that is capable of forming strongly water repellent and highly water resistant films and coatings. The invention also relates to a paint or coating additive that is highly compatible with paints and coating compositions and that includes the emulsion.

BACKGROUND OF THE INVENTION

Japanese Patent Application Publication 5-9248 (9,248/1993) and Japanese Patent Application Publication 1-284513 (284,513/1989) disclose silicone grafted vinyl copolymer emulsions with improved water repellency, water resistance, and lubricity of vinyl polymer emulsions. These silicone grafted vinyl copolymer emulsions are produced by emulsion polymerization of vinyl monomers with straight chain or partially branched silicone macromonomers bearing radically polymerizable functional groups. One problem, however, is the presence of residual unpolymerized silicone macromonomer after completion of the reaction. This is due to the inadequate reactivity of the silicone macromonomer with the vinyl monomer during emulsion polymerization. When the resulting vinyl copolymer emulsion is coated on a substrate, the unpolymerized silicone macromonomer bleeds out onto the surface of the coating. This impairs its compatibility with other materials, diminishes its adherence with various substrates, and reduces printability. In addition, the silicone grafted vinyl copolymer emulsions have an inadequate storage stability, while coatings produced from these compositions exhibit an inadequate water repellency and an inadequate water resistance. Finally, these silicone grafted vinyl copolymer emulsions suffer from the problem that they exhibit an unsatisfactory compatibility with water-borne coating compositions when employed as modifiers of waterborne coatings.

BRIEF SUMMARY OF THE INVENTION

Therefore, it is an object of this invention is to provide a highly storage stable vinyl copolymer emulsion that can form strongly water repellent and highly water resistant films and coatings. Another object is to provide paint or coating additives that are highly compatible with paints and coatings. These and other features of the invention will become apparent from a consideration of the detailed description.

BRIEF DESCRIPTION OF THE SEVERAL VIEWS OF THE DRAWING

Not applicable.

DETAILED DESCRIPTION OF THE INVENTION

The vinyl copolymer emulsion according to this invention is obtained by the emulsion polymerization of:
(A) 50–99.9 weight percent a vinyl monomer;
(B) 0.1–50 weight percent of an organosilicon compound bearing a radically polymerizable organic group, the compound having the formula

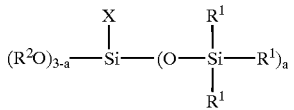
(1)

in which X is a radically polymerizable organic group, $R^1$ is a $C_1$ to $C_{10}$ alkyl group or a $C_6$ to $C_{12}$ aryl group, $R^2$ is a $C_1$ to $C_{10}$ alkyl group, a is a number with an average value of 2–3; the sum of the amounts of components (A) and (B) being 100 weight percent; and
(C) a radically polymerizable surfactant used at 0.1–20 weight parts for each 100 weight parts of the total amount of components (A) and (B). The emulsion is useful as a paint and coating additive.

The vinyl monomer (A) should bear a radically polymerizable vinyl group, but the type and the properties of vinyl monomer (A) are not otherwise critical. When it is desired to obtain an improved water resistance for a film or coating, the main constituents of component (A) are preferably hydrophobic vinyl monomers and radically crosslinking vinyl monomer.

Hydrophobic vinyl monomers are exemplified by (i) alkyl (meth)acrylates such as methyl acrylate, ethyl acrylate, n-propyl acrylate, isopropyl acrylate, n-butyl acrylate, isobutyl acrylate, tert-butyl acrylate, n-hexyl acrylate, cyclohexyl acrylate, 2-ethylhexyl acrylate, octyl acrylate, lauryl acrylate, stearyl acrylate, methyl methacrylate, ethyl methacrylate, n-propyl methacrylate, isopropyl methacrylate, n-butyl methacrylate, isobutyl methacrylate, tert-butyl methacrylate, n-hexyl methacrylate, cyclohexyl methacrylate, 2-ethylhexyl methacrylate, octyl methacrylate, lauryl methacrylate, and stearyl methacrylate; (ii) aromatic group containing (meth)acrylates such as benzyl acrylate, phenoxyethyl acrylate, benzyl methacrylate, and phenoxyethyl methacrylate; (iii) vinyl esters of aliphatic acids such as vinyl acetate, vinyl propionate, vinyl butyrate, vinyl caproate, vinyl 2-ethylhexanoate, vinyl laurate, and vinyl stearate; (iv) aromatic vinyl monomers such as styrene and vinyltoluene; (v) diene monomers such as butadiene and isoprene; (vi) halogenated vinyl monomers such as vinyl chloride and vinylidene chloride; (vii) nitrile monomers such as acrylonitrile and methacrylonitrile; and (viii) diorganopolysiloxanes bearing a radically polymerizable functional group such as an acrylic, methacrylic, or styryl group, at one molecular chain terminal. Most preferred are alkyl (meth)acrylates and aromatic vinyl monomers such as styrene.

The radically crosslinking vinyl monomers are compounds containing at least two radically polymerizable organic groups in their molecule. These compounds are exemplified by (i) alkenyl (meth)acrylates such as allyl methacrylate and allyl acrylate; (ii) multifunctional (meth)acryloyl functional compounds such as trimethylolpropane triacrylate, pentaerythritol triacrylate, ethylene glycol diacrylate, tetraethylene glycol diacrylate, polyethylene glycol diacrylate, 1,4-butanediol diacrylate, 1,6-hexanediol diacrylate, neopentyl glycol diacrylate, trimethylolpropane trioxyethylacrylate, tris(2-hydroxyethyl)isocyanurate diacrylate, tris(2-hydroxyethyl)isocyanurate triacrylate, trimethylolpropane trimethacrylate, pentaerythritol trimethacrylate, ethylene glycol dimethacrylate, tetraethylene glycol dimethacrylate, polyethylene glycol dimethacrylate, 1,4-butanediol dimethacrylate, 1,6-hexanediol dimethacrylate, neopentyl glycol dimethacrylate, trimethylolpropane trioxyethylmethacrylate, tris(2-hydroxyethyl)isocyanurate dimethacrylate, and tris(2-hydroxyethyl)isocyanurate trimethacrylate; (iii) diacrylates and dimethacrylates of diols that are adducts of ethylene oxide or propylene oxide on bisphenol A, and diacrylates and dimethacrylates of diols that are adducts of ethylene oxide or propylene oxide on hydrogenated bisphenol A; (iv) methacryloxypropyl functional polydimethylsiloxanes; and (v) multifunctional vinyl monomers such as divinylbenzene, triethylene glycol divinyl ether, and styryl functional polydimethylsiloxanes. The radically crosslinking vinyl monomer is employed in the range of 0.1–10 weight percent of the overall vinyl monomer content, preferably in the range of 1–5 weight percent.

In addition to vinyl monomers such as described above, component (A) may contain other vinyl monomers that bear a reactive functional group and/or vinyl monomers bearing a property conferring functional group. Monomers of this type are exemplified by (i) hydroxyl functional vinyl monomers such as 2-hydroxyethyl acrylate, 2-hydroxybutyl acrylate, 2-hydroxypropyl acrylate, 2-hydroxyethyl methacrylate, 2-hydroxybutyl methacrylate, and 2-hydroxypropyl methacrylate; (ii) epoxy functional vinyl monomers such as glycidyl acrylate, 3,4-epoxycyclohexylmethyl acrylate, glycidyl methacrylate, and 3,4-epoxycyclohexylmethyl methacrylate; (iii) amino functional vinyl monomers such as dimethylaminoethyl acrylate, dimethylaminoethyl methacrylate, diethylaminoethyl acrylate, and diethylaminoethyl methacrylate; (iv) amide functional vinyl monomers such as acrylamide, N-methylolacrylamide, N-methoxymethylacrylamide, isobutoxymethoxyacrylamide, N,N-dimethylacrylamide, methacrylamide, N-methylolmethacrylamide, N-methoxymethylmethacrylamide, isobutoxymethoxymethacrylamide, and N,N-dimethylmethacrylamide; (v) fluorinated vinyl monomers such as trifluoropropyl acrylate, perfluorobutylethyl acrylate, perfluorooctylethyl acrylate, trifluoropropyl methacrylate, perfluorobutylethyl methacrylate, and perfluorooctylethyl methacrylate; and (vi) ether linkage containing vinyl monomers such as tetrahydrofurfuryl acrylate, butoxyethyl acrylate, ethoxydiethylene glycol acrylate, polyethylene glycol acrylate, polypropylene glycol monoacrylate, hydroxybutyl vinyl ether, cetyl vinyl ether, 2-ethylhexyl vinyl ether, tetrahydrofurfuryl methacrylate, butoxyethyl methacrylate, ethoxydiethylene glycol methacrylate, polyethylene glycol methacrylate, and polypropylene glycol monomethacrylate.

Some examples of additional vinyl monomers that bear a reactive functional group and/or vinyl monomers that bear a property conferring functional group include alkoxysilanes containing a radically polymerizable unsaturated group such as $CH_2=CHCOOC_3H_6Si(OCH_3)_3$, $CH_2=C(CH_3)COOC_3H_6Si(OCH_3)_3$, $CH_2=C(CH_3)COOC_3H_6Si(CH_3)(OCH_3)_2$, $CH_2=C(CH_3)COOC_3H_6Si(CH_3)_2OCH_3$, $CH_2=C(CH_3)COOC_2H_4OC_3H_6Si(OCH_3)_3$, $CH_2=C(CH_3)COOC_{12}H_{24}Si(OCH_3)_3$, $CH_2=CHOC_3H_6Si(CH_3)(OC_2H_5)_2$, $CH_2=CHSi(OCH_3)_3$, $CH_2=CHSi(OC_2H_5)_3$, and $CH_2=CHSi(C_4H_9)(OC_4H_9)_2$.

Further examples of vinyl monomers bearing a reactive functional group and/or vinyl monomers bearing a property-conferring functional group include dibutyl fumarate; maleic anhydride; dodecylsuccinic anhydride; radically polymerizable unsaturated carboxylic acids such as acrylic acid, methacrylic acid, itaconic acid, crotonic acid, fumaric acid, and maleic acid, as well as their salts, ammonium salts, and organic amine salts; radically polymerizable unsaturated monomers that contain a sulfonic acid residue such as styrene sulfonic acid as well as their alkali metal salts, ammonium salts, and organic amine salts; quaternary ammonium salts derived from (meth)acrylic acid such as 2-hydroxy-3-methacryloxypropyl trimethylammonium chloride; and methacrylate esters of alcohols that contain a tertiary amine group such as the diethylamine ester of methacrylic acid as well as the quaternary ammonium salt thereof.

When a vinyl monomer is used which bears a reactive functional group such as amino, epoxy, carboxyl, hydroxyl, blocked isocyanate, or silyl group such as alkoxysilyl or acetoxysilyl, the film or coating of the vinyl copolymer emulsion or the paint or coating composition containing the emulsion can undergo crosslinking. This feature provides additional enhancements in water resistance of paints or coatings. The crosslinking can be of a self crosslinking type or it may be induced by using a crosslinker such as melamine, a multifunctional epoxy compound or multifunctional isocyanate compound. Crosslinking catalysts can also be used.

Component (B) is an organosilicon compound bearing a radically polymerizable organic group. It has the formula

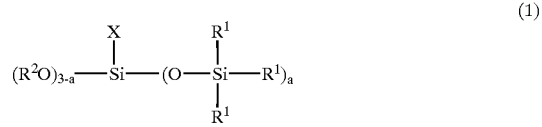

(1)

The X group in formula (1) represents a radically polymerizable organic group and is exemplified by (i) acryl and methacryl functional organic groups with the formulas

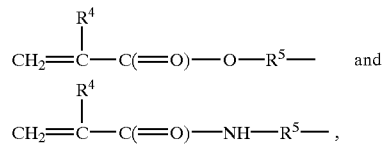   and (ii) styryl functional organic groups with the formula

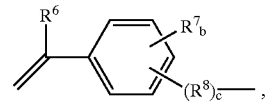

and (iii) $C_2$ to $C_{10}$ alkenyl groups.

$R^4$ and $R^6$ in the above formulas each denote hydrogen or methyl; $R^5$ and $R^8$ each denote a $C_1$ to $C_{10}$ alkylene group; $R^7$ denotes a $C_1$ to $C_{10}$ alkyl group; b is zero or an integer with a value of 1 to 4; and c is 0 or 1. The radically polymerizable organic group X is exemplified by acryloxymethyl, 3-acryloxypropyl, methacryloxymethyl, 3-methacryloxypropyl, 4-vinylphenyl, 3-vinylphenyl, 4-(2-propenyl)phenyl, 3-(2-propenyl)phenyl, 2-(4-vinylphenyl)ethyl, 2-(3-vinylphenyl)ethyl, vinyl, allyl, methallyl, and 5-hexenyl.

$R^1$ in formula (1) is a $C_1$ to $C_{10}$ alkyl group or a $C_6$ to $C_{12}$ aryl group. The alkyl group is exemplified by methyl, ethyl, propyl, butyl, pentyl, isopropyl, isobutyl, cyclopentyl, and cyclohexyl. The aryl group is exemplified by phenyl and naphthyl. Methyl and phenyl groups are preferred for $R^1$ particularly methyl. $R^2$ in formula (1) is a $C_1$ to $C_{10}$ alkyl group exemplified by methyl, ethyl, propyl, butyl, pentyl, isopropyl, isobutyl, cyclopentyl, and cyclohexyl, with methyl being the preferred group.

Component (A) is used in an amount corresponding to 50–99.9 weight percent of the total amount of components (A) and (B), preferably 75–99.9 weight percent of the total amount of components (A) and (B).

Component (B) is exemplified by compounds with the following average formulas in which Me represents the methyl group:

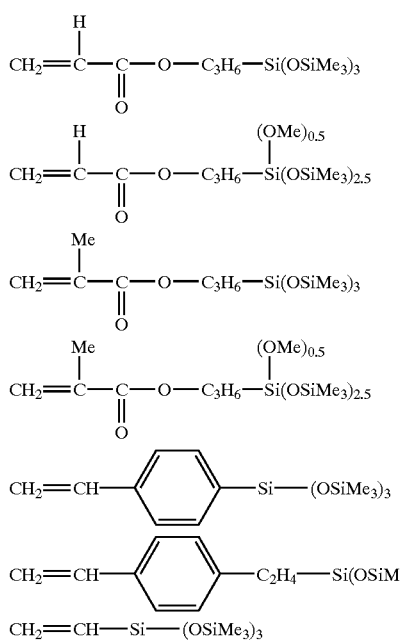

Component (B) can be synthesized by methods known in the art. Component (B) is employed in a quantity corresponding to 0.1–50 weight percent of the total amount of components (A) and (B), preferably 0.1–25 weight percent of the total amount of components (A) and (B). The beneficial features of component (B) do not appear when component (B) is used at less than 0.1 weight percent, while film strength and compatibility are reduced when it is used at more than 50 weight percent.

The radically polymerizable surfactant component (C) should exhibit surfactancy, and it should be capable of undergoing radical polymerization. Component (C) may be an anionic, nonionic, or cationic surfactant. Below are shown various structures representative of component (C). In these structures, R is hydrogen or a methyl group, $R^1$ is hydrogen or a C1–20 alkyl group, $R^2$ is an alkylene radical, AO is an alkylene oxide, M is an alkali metal, X is a halogen atom, EO is ethylene oxide, PO is propylene oxide, and x is 1–50.

Anionic surfactants representative of component (C) are exemplified by compounds with the following structures.

Acrylic Types of Anionic Surfactant (C)

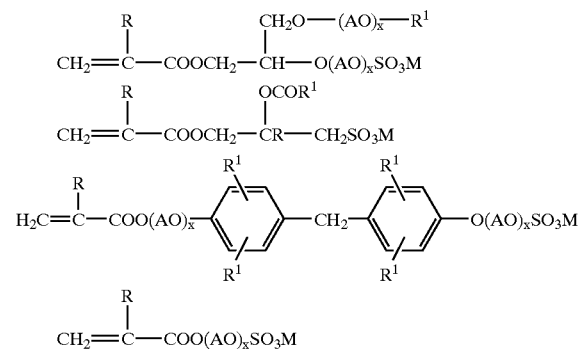

Allylic Types of Anionic Surfactant (C)

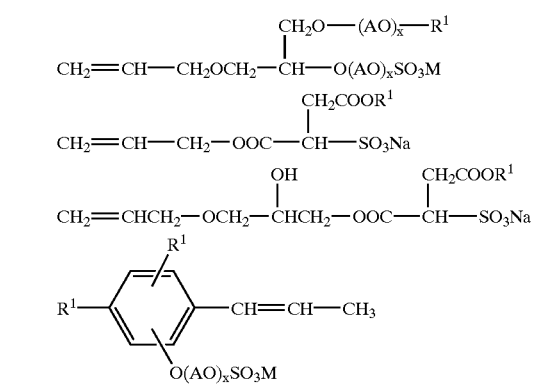

Maleic Acid Types of Anionic Surfactant (C)

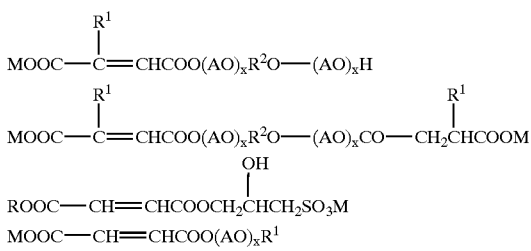

Itaconic Acid Types of Anionic Surfactant (C)

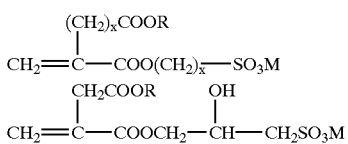

The nonionic types of radically polymerizable surfactant (C) can be exemplified by the following compounds.

Acrylic Types of Nonionic Surfactant (C)

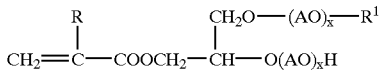

-continued

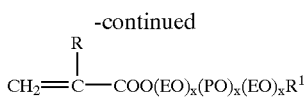

Allylic Types of Nonionic Surfactant (C)

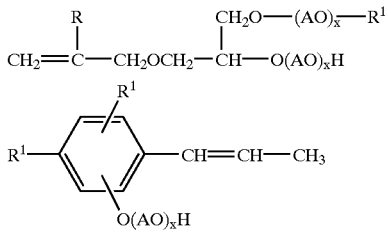

Maleic Acid Types of Nonionic Surfactant (C)

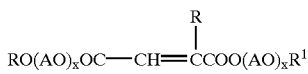

Itaconic Acid Types of Nonionic Surfactant (C)

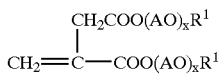

The cationic types of radically polymerizable surfactant (C) can be exemplified by the following compounds.

Acrylic Types of Cationic Surfactant (C)

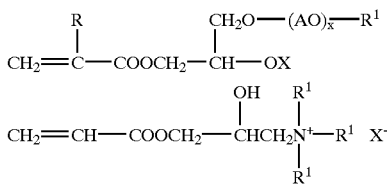

Allylic Types of Cationic Surfactant (C)

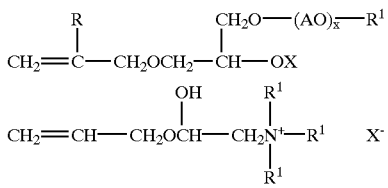

The following surfactants are most preferred.

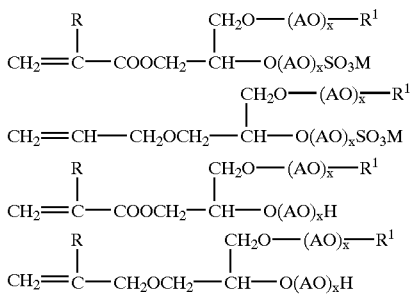

-continued

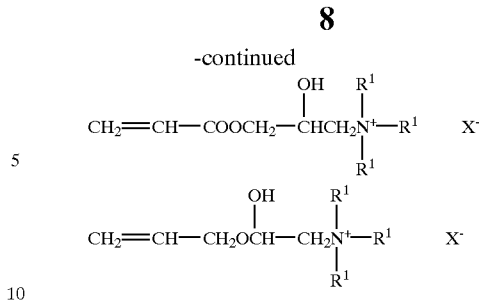

Component (C) can be a single surfactant or combination of two or more surfactants. It is used in amounts of 0.1–20 weight parts per 100 weight parts of the total amount of components (A) and (B). When it is desired to obtain better water resistance, component (C) should be present in amounts of 0.1–3 weight parts per 100 weight parts of the total amount of components (A) and (B).

The vinyl copolymer emulsion according to this invention is obtained by the emulsion polymerization of components (A), (B), and (C). A radical polymerization initiator can be used in the emulsion polymerization process to shorten reaction time. Some suitable radical polymerization initiators include inorganic peroxides such as potassium persulfate, sodium persulfate, and ammonium persulfate; organoperoxides such as tert-butyl peroxymaleic acid, succinic acid peroxide, and tert-butyl hydroperoxide; water soluble azo-type radical initiators such as 2,2'-azobis{2-(N-benzylamidino)propane} hydrochloride, 2,2'-azobis{2-(N-2-hydroxyethylamidino)propane} hydrochloride, and 2,2'-azobis(2-methyl-N-hydroxyethyl)propionamide; oil soluble azo-type radical initiators such as 2,2'-azobisisobutyronitrile, 2,2'-azobis-2,4-dimethylvaleronitrile, 1-azobis-1-cyclohexanecarbonitrile, dimethyl 2,2'-azobisisobutyrate, and 4,4'-azobis-4-cyanovaleric acid; and oil soluble peroxides such as lauroyl peroxide, benzoyl peroxide, dicumyl peroxide, cyclohexanone peroxide, di-n-propyl peroxydicarbonate, and tert-butyl peroxypivalate. The radical initiator is used in amounts of 0.01–20 weight parts, preferably 0.1–10 weight parts, in each case per 100 weight parts of the total amount of components (A) and (B).

The particular sequence of conducting emulsion polymerization is not critical, however, the following methods can be used as being representative of the process. In one method, the mixture of components (A), (B), and (C) is first emulsified and dispersed in an aqueous medium, the radical initiator is added to the emulsion, and polymerization is carried out by heating. In another method, components (B) and (C) are first emulsified and dispersed in an aqueous medium, component (A) is added to the emulsion, followed by addition of the radical initiator, and polymerization is thereafter carried out by heating. In either case, the emulsified dispersion can be prepared using known emulsification devices such as a colloid mill or an homogenizer. Polymerization should be carried out for 2–8 hours at 50–90° C. It can be carried out while adding the emulsified dispersion dropwise into the water at 50–90° C., or after introducing the entire emulsified dispersion in one batch into water at 50–90° C.

If desired, a chain transfer agent for use in radical polymerization may be included with components (A), (B), and (C). Some appropriate chain transfer agents are exemplified by mercapto compounds such as 2-mercaptoethanol, butyl mercaptan, n-dodecyl mercaptan, 3-mercaptopropyltrimethoxysilane, and mercaptopropyl functional polydimethylsiloxanes; halogen compounds such as methylene chloride, chloroform, carbon tetrachloride, butyl bromide, and 3-chloropropyltrimethoxysilane; and the alpha-methylstyrene dimer.

The post polymerization particle size of the copolymer emulsion is not critical. However, from the standpoint of storage stability and prevention of appearance of aggregates, it should be no greater than 1.0 μm, preferably no greater than 0.5 μm, and most preferably no greater than 0.3 μm. A thickener can also be added and/or the specific gravity can be adjusted, when the particle size is 1.0 μm or above. Similarly, the solids content of the composition can range from 10–80 weight percent, preferably 15–60 weight percent.

Other additives such as colorants, stabilizers, fats, oils, waxes, and fillers, can be included. The composition may contain a curing catalyst for alkoxysilyl or silanol groups within a range that would not impair stability of the composition. Some representative curing catalysts are organometallic salts, metal alkoxides, metal chelates, organic amines, and quaternary ammonium salts. The curing catalyst will function to improve adherence of the composition to substrates by accelerating the reaction between the composition of the invention and the surface of various substrates.

One benefit of the vinyl copolymer emulsion according to this invention is the low content of unreacted silicone in the vinyl copolymer produced by emulsion polymerization. This is because there exists high reactivity between the vinyl monomer and the radically polymerizable organosilicon compound. As a consequence, the films, coatings, and cured products obtained from the vinyl copolymer emulsion possess excellent compatibility with other materials such as organic resins, an excellent adherence for various substrates, resistance to slippage or sliding due to improved friction properties, and excellent printability and writability. Such films, coatings, and cured products also exhibit excellent weathering resistance, UV resistance, gloss retention, waterproofness, icing resistance, and acid resistance. In addition, the use of a radically polymerizable surfactant results in very good water resistance, while storage stability is also excellent. Since the vinyl copolymer emulsion is a waterborne system, it is very safe and imposes little environmental burden in terms of air pollution, for example.

Such features render compositions according to the invention useful as a resin or an additive for application in paints and coatings. It can also constitute the main ingredient or additive for waxes, paper processing agents, fiber treatment agents, film processing agents, cosmetics, civil engineering resins, adhesives, and pressure-sensitive adhesives. Films or coatings of the compositions can be formed by coating the composition on any of a number of various substrates and heating it for 5 minutes to 10 hours at 30–90° C., or by maintaining it at room temperature for 1 hour to 5 days. The film or coating thickness will generally be from 0.1–100 μm.

EXAMPLES

The invention can be explained in greater detail by reference to the following working examples. Parts in the examples is weight parts, and Me where it appears represents the methyl group. The following methods were used to measure and evaluate properties of the emulsions and coatings.

Unreacted Silicone in Emulsions

The residual amount of unreacted silicone in an emulsion was measured and is reported as weight percent with reference to the amount of silicone originally added.

Storage Stability of Emulsions

The emulsion composition was held at quiescence for three months at room temperature, after which the composition was evaluated for the occurrence of aggregation, sedimentation, and separation. Results of the evaluation were scored as follows.

+: no aggregation, separation, or sedimentation was observed, x: aggregation and/or separation and/or sedimentation was observed.

Water Repellency of Coatings

The contact angle of coatings versus water was measured using an automatic contact angle meter.

Water Resistance of Coatings

Coated test specimens was immersed for 24 hours in ion exchanged water. After this period, the coatings was inspected for the occurrence of white haze and delamination. The results of the inspections were evaluated as follows.

+: no change, and x: occurrence of white hazing and coating delamination.

Printability of Coatings

The surface of coatings was marked with a black ink pen, and the extent of ink crawling was inspected. The results of the inspections were evaluated as follows.

+: no abnormalities seen, and x: crawling observed in some regions or substantial crawling, and marking was difficult.

Staining Resistance of Coatings

The surface of coatings was marked with a black ink pen and air dried for 10 minutes. The surface was wiped with defatted cotton impregnated with isopropyl alcohol. The surface of the coatings was visually evaluated and scored on the following scale.

+: absolutely no residue from markings observed, and x: presence of residues from markings observed.

Coefficient of Friction (COF) of Coatings

The emulsion composition was coated and dried onto a test specimen. The COF was measured using a thrust friction tester operated at a peripheral velocity of 10 cm/s under a load of 2 kgf.

Reference Example 1

50 parts of methyl methacrylate, 50 parts of n-butyl acrylate, and one part of 2,2'-azobisisobutyronitrile were mixed. To the mixture was added one part of sodium lauryl sulfate and 100 parts of deionized water. This was followed by emulsification and dispersion using an homogenizer. 50 parts of deionized water was introduced into a separate flask, and while holding it at 80° C. under a nitrogen current, 200 parts of the emulsion was added dropwise over two hours while stirring. Once addition was complete, maturation was carried out for an additional two hours at 80° C. to provide a vinyl copolymer emulsion paint with an average particle size of 0.15 μm and a nonvolatile fraction of 40 percent. The emulsion was coated on a polished soft steel sheet 0.5 mm thick in an amount to provide a post drying film thickness of 20 μm. Drying for one week at room temperature resulted in a colorless and transparent coating.

Example 1

10 parts of an organosilicon compound with the structure

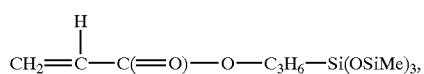

45 parts of methyl methacrylate, 45 parts of n-butyl acrylate, 2 parts of allyl methacrylate, and one part of 2,2'-azobisisobutyronitrile were mixed together. To the mixture were added one part of Adeka Reasoap NE-20 surfactant, a product of Asahi Denka Kogyo Kabushiki Kaisha, with the structure

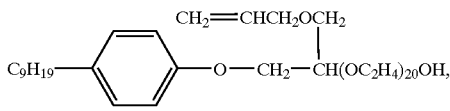

and 100 parts of deionized water, followed by emulsification and dispersion using an homogenizer. 50 parts of deionized water was placed in a separate flask and held at 80° C. under a nitrogen current. Into the water was added dropwise 200 parts of the emulsion over a period of two hours while stirring. Maturation was continued for two hours at 80° C. This resulted in production of a silyl functional vinyl copolymer emulsion designated A1. Emulsion A1 had an average particle size of 0.29 $\mu$m and contained 40 percent of a nonvolatile fraction. Table 1 shows the results of measurement of unreacted silicone in emulsion A1 and the storage stability of emulsion A1.

Emulsion A1 was coated on a polished 0.5 mm thick soft steel sheet in an amount so as to provide a post drying film thickness of 20 $\mu$m, and thereafter dried for one week at room temperature. Properties of the coating measured were water repellency, water resistance, printability, staining resistance, and COF. The results are shown in Table 1. 10 parts of emulsion A1 was also blended with 90 parts of the emulsion prepared in Reference Example 1, and the resulting mixture was dried to a film. It was transparent when its appearance was inspected.

Example 2

20 parts of the organosilicon compound used in Example 1, 40 parts of methyl methacrylate, 40 parts of n-butyl acrylate, 2 parts of allyl methacrylate, and 0.5 part of 2,2'-azobisisobutyronitrile, were mixed together. To the mixture were added one part of the surfactant used in Example 1, and 100 parts of deionized water, followed by emulsification and dispersion using an homogenizer. 50 parts of deionized water was placed in a separate flask and was held at 80° C. under a nitrogen current. Into the water was added dropwise 200 parts of the emulsion over a period of two hours with stirring. Maturation continued for an additional two hours at 80° C., resulting in a silyl functional vinyl copolymer designated emulsion A2. Emulsion A2 had an average particle size of 0.15 $\mu$m and contained 40 percent of a nonvolatile fraction. Table 1 shows the results of measurement of unreacted silicone in emulsion A2 and its storage stability.

Emulsion A2 was coated on polished 0.5 mm soft steel sheet in an amount to provide a post drying film thickness of 20 $\mu$m, and dried for one week at room temperature. The properties of the coating measured were water repellency, water resistance, printability, staining resistance, and COF. The results are shown in Table 1. 10 parts of emulsion A2 was also blended with 90 parts of the emulsion prepared in Reference Example 1, and the resulting mixture was dried to a film. The film was transparent when its appearance was inspected.

Example 3

20 parts of the organosilicon compound used in Example 1, 40 parts of methyl methacrylate, 40 parts of n-butyl acrylate, 2 parts of ethylene glycol dimethacrylate, and 0.5 part of 2,2'-azobisisobutyronitrile, were mixed together. To the mixture were added one part of Eleminol JS-2 surfactant of Sanyo Chemical Industries, Ltd., having the structure

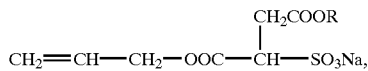

in which R is an alkyl group, and 100 parts of deionized water, followed by emulsification and dispersion using an homogenizer. 50 parts of deionized water was placed in a separate flask and maintained at 80° C. under a nitrogen current. Into he water was added dropwise 200 parts of the emulsion over a period of two hours with stirring. Maturation continued for an additional two hours at 80° C. resulting in a silyl functional vinyl copolymer emulsion designated A3. Emulsion A3 had an average particle size of 0.27 $\mu$m and contained 40 percent of a nonvolatile fraction. Table 1 shows the results of measurement of unreacted silicone in emulsion A3 and its storage stability.

Emulsion A3 was coated on a polished 0.5 mm thick soft steel sheet in an amount to provide a post drying film thickness of 20 $\mu$m, and it was dried for one week at room temperature. The properties of the coating measured were water repellency, water resistance, printability, staining resistance, and COF. The results are shown in Table 1. 10 parts of emulsion A3 were also blended with 90 parts of the emulsion prepared in Reference Example 1, and the resulting mixture was dried to a film. The film was transparent when its appearance was inspected.

Example 4

10 parts of the organosilicon compound used in Example 1, one part of the surfactant used in Example 1, and 15 parts of deionized water, were combined and then emulsified and dispersed using an homogenizer. After addition of 85 parts of deionized water to the emulsion with stirring, a mixture of 45 parts of methyl methacrylate, 45 parts of n-butyl acrylate, and 2 parts of allyl methacrylate was gradually added dropwise to provide an emulsion. 0.5 part of potassium persulfate was also dissolved in the emulsion. 50 parts of deionized water was placed in a separate flask and held at 80° C. under a nitrogen current. Into the water was added dropwise 200 parts of the emulsion over a period of two hours with stirring. Maturation was allowed to continue for an additional two hours at 80° C., resulting in a silyl functional vinyl copolymer emulsion designated A4. Emulsion A4 had an average particle size of 0.28 $\mu$m and contained 40 percent of a nonvolatile fraction. Table 1 shows the results of the measurement of unreacted silicone in emulsion A4 and its storage stability.

Emulsion A4 was coated on a polished 0.5 mm thick soft steel sheet in an amount sufficient to provide a post drying film thickness of 20 $\mu$m, and thereafter dried for one week at room temperature. The properties of the coating measured were water repellency, water resistance, printability, staining resistance, and COF. The results are shown in Table 1. 10 parts of emulsion A4 were also blended with 90 parts of the emulsion prepared in Reference Example 1, and the mixture was dried to a film. The film was transparent.

Comparative Example 1

10 parts of an organopolysiloxane with the structure

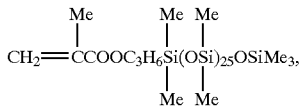

45 parts of methyl methacrylate, 45 parts of n-butyl acrylate, and 0.5 part of 2,2'-azobisisobutyronitrile, were mixed together. One part of sodium lauryl sulfate and 100 parts of deionized water were added to the mixture, followed by emulsification and dispersion using an homogenizer. 50 parts of deionized water were placed in a separate flask and held at 80° C. under a nitrogen current. Into the water was added dropwise 200 parts of the emulsion over a period of two hours with stirring. Maturation continued for an additional two hours at 80° C. resulting in a silyl functional vinyl copolymer emulsion designated B1. Emulsion B1 had a molecular weight of 50,000 and an average particle size of 0.40 μm. It contained 40 percent of nonvolatile fraction. Table 1 shows the results of measurements of the unreacted silicone in emulsion B1 and its storage stability.

Emulsion B1 was coated on a polished 0.5 mm soft steel sheet in an amount to provide a post drying film thickness of 20 μm and dried for one week at room temperature. The properties of the coating measured were water repellency, water resistance, printability, staining resistance, and COF. The results are shown in Table 1. 10 parts of emulsion B1 were blended with 90 parts of the emulsion prepared in Reference Example 1, and the mixture was dried to a film. The film had a hazy white appearance.

TABLE 1

|  | Example 1 | Example 2 | Example 3 | Example 4 | Comparative Example 1 |
| --- | --- | --- | --- | --- | --- |
| Unreacted Silicone (Percent) | 1 | 2 | 2 | 1 | 21 |
| Water Repellency (Contact angle) | 100 | 101 | 101 | 100 | 92 |
| Water Resistance | + | + | + | + | x |
| Printability | + | + | + | + | x |
| Staining Resistance | + | + | + | + | x |
| COF | 0.22 | 0.21 | 0.20 | 0.20 | 0.12 |
| Storage Stability | + | + | + | + | x |

The vinyl copolymer emulsion of the invention is obtained by emulsion polymerizing vinyl monomer (A) with organosilicon compound (B) that contains a radically polymerizable organic group, in the presence of a radically polymerizable surfactant (C), and therefore has excellent storage stability, and it is able to form highly water repellent and strongly water resistant films and coatings. Paint and coating additives containing the emulsion are highly blendable into paint and coating compositions, and able to impart properties such as water repellency and water resistance to the paints and coatings.

Other variations may be made in compounds, compositions, and methods described herein without departing from the essential features of the invention. The embodiments of the invention specifically illustrated herein are exemplary only and not intended as limitations on their scope except as defined in the appended claims.

What is claimed is:

1. A vinyl copolymer emulsion comprising a composition obtained by emulsion polymerizing (A) 50–99.9 weight percent of a vinyl monomer, (B) 0.1–50 weight percent of an organosilicon compound bearing a radically polymerizable organic group and the formula

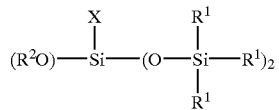

in which X is a radically polymerizable organic group, $R^1$ is a $C_1$ to $C_{10}$ alkyl group or a $C_6$ to $C_{12}$ aryl group, $R^2$ is a $C_1$ to $C_{10}$ alkyl group, wherein the total amount of components (A) and (B) is 100 weight percent, and (C) a radically polymerizable surfactant present at 0.1–20 weight parts for each 100 weight parts of the total amount of components (A) and (B).

2. The emulsion of claim 1 in which X is (i) an acryl- or methacryl functional organic group with the formula

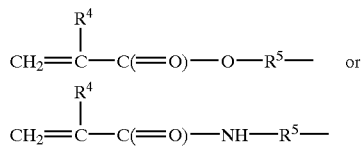

in which $R^4$ is the hydrogen or a methyl group, and $R^5$ is a $C_1$ to $C_{10}$ alkylene group;

(ii) a styryl functional organic group with the formula

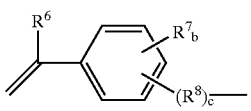

in which $R^6$ is hydrogen or a methyl group, $R^7$ is a $C_1$ to $C_{10}$ alkyl group, $R^8$ is a $C_1$ to $C_{10}$ alkylene group, b is zero or 1–4, and c is 0 or 1; or (iii) a $C_2$ to $C_{10}$ alkenyl group.

3. The emulsion of claim 2 in which component (A) is a hydrophobic vinyl monomer and a radically crosslinking vinyl monomer.

4. A method of treating a substrate to render it water repellent or water resistant comprising applying to the substrate the emulsion of claim 1 to form a film or coating on the substrate.

5. A paint or coating comprising a composition in which the emulsion according to claim 1 is an ingredient of the paint or coating.

* * * * *